United States Patent
Moisè et al.

(10) Patent No.: US 11,975,449 B2
(45) Date of Patent: May 7, 2024

(54) ACTUATION SYSTEM IN AN EXOSKELETON

(71) Applicant: IUVO S.R.L, Pontedera (IT)

(72) Inventors: Matteo Moisè, Pontedera (IT); Marco Muscolo, Pontedera (IT); Francesco Giovacchini, Pontedera (IT); Nicola Vitiello, Pontedera (IT)

(73) Assignee: IUVO S.R.L, Pontedera (IT)

( * ) Notice: Subject to any disclaimer, the term of this patent is extended or adjusted under 35 U.S.C. 154(b) by 783 days.

(21) Appl. No.: 17/051,975

(22) PCT Filed: May 2, 2019

(86) PCT No.: PCT/IB2019/053598
§ 371 (c)(1),
(2) Date: Oct. 30, 2020

(87) PCT Pub. No.: WO2019/211791
PCT Pub. Date: Nov. 7, 2019

(65) Prior Publication Data
US 2021/0237259 A1      Aug. 5, 2021

Related U.S. Application Data

(60) Provisional application No. 62/665,805, filed on May 2, 2018.

(51) Int. Cl.
*B25J 9/10* (2006.01)
*B25J 9/00* (2006.01)

(52) U.S. Cl.
CPC ............. *B25J 9/0006* (2013.01); *B25J 9/106* (2013.01)

(58) Field of Classification Search
USPC .................................... 700/26, 245, 17, 264
See application file for complete search history.

(56) References Cited

U.S. PATENT DOCUMENTS

| | | | |
|---|---|---|---|
| 9,554,960 B2 | 1/2017 | Kamon | |
| 10,603,242 B2 | 3/2020 | Vitiello et al. | |
| 11,432,988 B2 | 9/2022 | Vitiello et al. | |
| 2013/0331744 A1* | 12/2013 | Kamon | A61H 1/0266 601/35 |

(Continued)

FOREIGN PATENT DOCUMENTS

| | | |
|---|---|---|
| CN | 103200919 A | 7/2013 |
| CN | 106112988 A | 11/2016 |

(Continued)

OTHER PUBLICATIONS

Rupal, "Investigation of CVT-based Hybrid Mechanism for Torque Variations in a Knee Exoskeleton" Master's Thesis Thapar University Jul. 2016, 91 pgs (Year: 2016).*

(Continued)

*Primary Examiner* — Emilio J Saavedra
(74) *Attorney, Agent, or Firm* — Workman Nydegger

(57) ABSTRACT

An exoskeleton includes a frame; and an actuation system. The actuation system includes a transmission device; a passive joint mechanism connecting the frame to the transmission device, the passive joint mechanism having a four-bar linkage; and a drive system couples the passive joint mechanism to the transmission device, and is arranged to drive the transmission device.

14 Claims, 9 Drawing Sheets

(56) References Cited

U.S. PATENT DOCUMENTS

| | | | |
|---|---|---|---|
| 2015/0336265 A1 | 11/2015 | Choi et al. | |
| 2017/0367919 A1* | 12/2017 | Vitiello | A61H 1/0244 |
| 2020/0206063 A1 | 7/2020 | Vitiello et al. | |

FOREIGN PATENT DOCUMENTS

| | | |
|---|---|---|
| CN | 107669442 A | 2/2018 |
| IN | 107223044 A | 9/2017 |
| WO | 2016128877 A1 | 8/2016 |

OTHER PUBLICATIONS

Office Action in corresponding Chinese Patent Application No. 201980029798.3, dated Feb. 16, 2023.
International Search Report and Written Opinion from PCT Application No. PCT/IB2019/053598, dated Aug. 19, 2019.

* cited by examiner

ACTUATION SYSTEM IN AN EXOSKELETON

FIELD OF THE DISCLOSURE

The disclosure relates to a passive joint mechanism providing passive degrees of freedom in an actuation system of an exoskeleton, and by example in an active pelvic orthosis (APO) having a human interface.

BACKGROUND

Exoskeletons are becoming useful tools for addressing needs in healthcare and industrial applications. These devices are arranged to generate and transfer mechanical power to human joints. To work, these devices must achieve optimal kinematic coupling and compatibility between the human joints and rotation axes of the exoskeleton. An exoskeleton typically has mechatronic designs, control systems, and human-machine interfaces arranged differently according to the expected usage.

A common problem with exoskeletons is a misalignment between the human joints and the robot joints, which may lead to undesired forces being exerted on the human joints resulting in discomfort or injury. These undesired forces may cause misapplication of forces on the human limb resulting in unreliable torque transmission and chaffing from shells or other means for securing against the human limbs, and inefficient movement and poor compliance.

It is difficult to consistently align the human joints with the robot joints, in part because of the variability among individual human anatomies. Another reason is that even if the human and robot joints are properly aligned, the human joints do not perfectly rotate because the users' geometries are not consistent and are complex, fluctuating over a range of motion.

Given the above considerations, many exoskeletons have regulation mechanisms or passive degrees of freedom (DoF) to fit the device to the human body. It has been found it is possible to unload human articulations from undesired translational forces by decoupling joint rotations and translations by adding passive DoFs to exoskeleton joints.

An example of an exoskeleton is an active pelvis orthosis (APO), which is a wearable exoskeleton arranged to improve gait energy efficiency especially as affected by impairments of the hip. The APO may be of the type described in WO 2016/128877, which employs a chain or series of passive DoFs that allow the human flexion-extension axis to align with the control or actuation systems to give the user hip abduction/adduction rotation, and internal/external rotation. The APO includes a human interface to ensure comfort despite activation by the control or actuation system of the user's joints by the exoskeleton.

Despite the advancements in exoskeletons, there still exists opportunities and needs for improvement for an exoskeleton to balance comfort with efficacy in offering an actuation system arranged to offer DoF for improving a user's gait.

There are limitations in existing exoskeletons because the actuators are sub-optimally located on the device, causing discomfort and added bulk. Existing devices locate the actuators over a user's hips and align the axis or axes of rotation posterior to a user's femoral head. This creates problems because the motion of the user's hips through the gait cycle causes movement of and against the actuators, which interferes with the user's legs, causes discomfort, and requires the actuators to protrude posteriorly from the frame and the user. This also makes sitting difficult and uncomfortable, as the bulky actuators are positioned proximate a user's buttocks and lower back.

The chain or series of passive DoFs lacks a smooth and intuitive operation, adding to the difficulty of use and discomfort, as the actuation system must be adjusted in series and limited directions.

There is a need for an actuation system in an exoskeleton that overcomes these problems in existing devices without compromising the effectiveness of transmission of forces from the robot joints.

SUMMARY

Embodiments of the disclosure relate to an actuation system in an exoskeleton, including at least one passive joint mechanism providing passive degrees of freedom, and by example in an active pelvic orthosis (APO) having a human interface. The embodiments have the benefit of limiting excursion into areas of activity of the user during use, while not encumbering the user's gait.

The APO can provide assistive pairs of flexion-extension actuators or actuation systems at one or both hips of the user. The exoskeletal structure in the APO extends from the user's torso to the hip, and at least a part of the user's lower limbs. The actuation system has limited lateral dimensions, allowing the user to freely move the arms such as by allowing the arms to swing freely at the user's sides. Such a limited lateral encumbrance is a consequence of the positioning of an actuator in the back of the system itself and the posterior side of the user.

The actuation system enables the user to freely perform abduction-adduction movements of the leg without obstructing the user's gait. The actuation system may also offer an intra-extra rotation of the hip, realizing a "floating" configuration of the actuators on the frame of the exoskeleton.

From the location and configuration of the actuation system in the embodiments, the actuation system is configured to adapt to different anthropometries or dimensions of the user. The system may include a transmission device extending substantially parallel to the sagittal plane of the user and having an adjustable longitudinal dimension, to allow a user to choose the distance between the actuator and a link which transmits the assistive force or effect to the articular segment of the user's thigh.

The actuation system is configured in such a way that its axis of flexion-extension of the hip and its axis of abduction/adduction of the hip are incident in a point corresponding, in use, to the center of the femoral head of the user but without positioning the actuators directly proximate the femoral head as in existing devices. This is achieved through the above-mentioned adjustment of the longitudinal extension of the transmission device and using corresponding adjustability of the width of the actuation system on the frontal plane of the user.

The embodiments of the abduction/adduction control are achieved by a linkage or joint located generally proximate the user's lumbar or torso region, as opposed to past efforts and devices that locate the joint over the user's hips. The embodiments have the advantage of mitigating interference with the user's legs, and mounting the linkage in an area over the user that undergoes comparatively little movement during a user's gait. There is improved seating comfort, and there is a reduced distance between the actuation devices and the user's body. The linkage generally maintains the same center of rotation as in past efforts and devices. The actuation system of the disclosure advantageously provides enhanced comfort and compliance without compromising the effectiveness of the exoskeleton, actuators, or otherwise.

The embodiments of the actuation system make the APO compatible with the degrees of freedom, the angular extensions and, in general, the kinematics of the joints of the user, including the passive ones. Of interest to the embodiments is the passive joint mechanism for adduction/abduction, which relies on the linkage that is a multi-bar linkage, enabling the linkage to be located remotely from the center of rotation, while still providing effective and robust rotation of the actuation system to accommodate adduction/abduction and rotation of the hip.

The embodiments of the actuation system are effective in assisting many physical activities, particularly walking on the ground level and uphill/downhill, ascending/descending steps, transitioning from sitting/standing ("sit-to-stand") or vice versa, and in general, for engaging in motor activities for rehabilitation of the lower limbs.

These and other features, aspects, and advantages of the present disclosure will become better understood regarding the following description, appended claims, and accompanying drawings.

Figure 1:
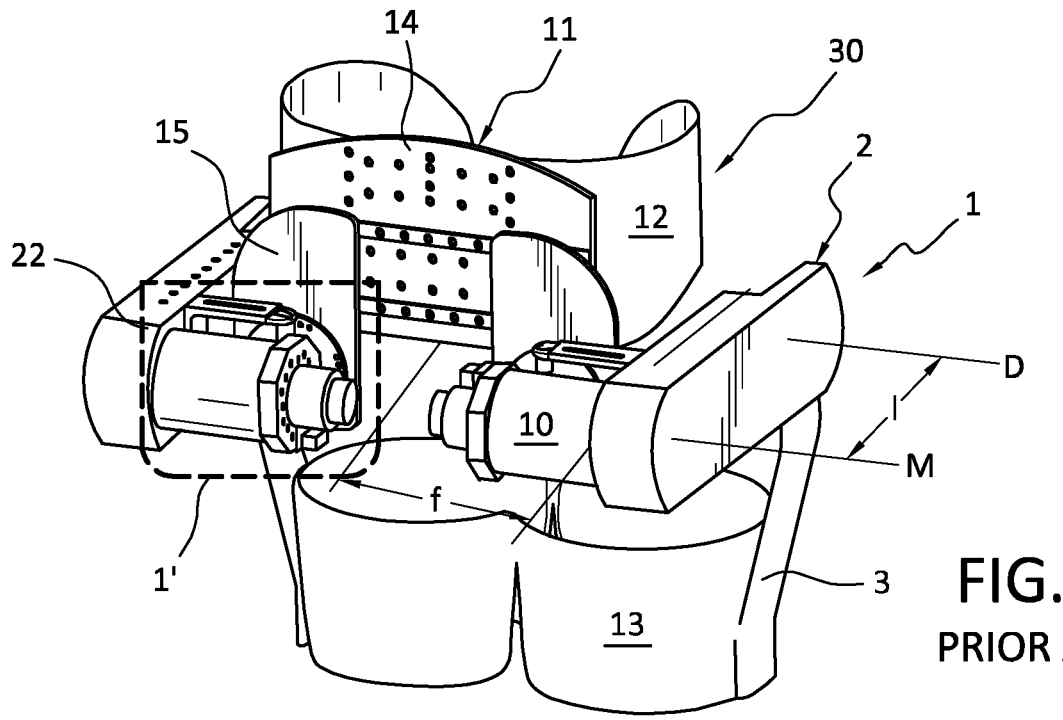
FIG. 1 is a perspective view of a prior art actuation system for an APO.

The drawing figures are not necessarily drawn to scale, but instead, are drawn to provide a better understanding of the components, and are not intended to be limiting in scope, but to provide exemplary illustrations.

DETAILED DESCRIPTION OF VARIOUS EMBODIMENTS

A. Overview

A better understanding of different embodiments of the disclosure may be had from the following description read with the accompanying drawings in which like reference characters refer to like elements.

For further ease of understanding the embodiments of an actuation system and variants as disclosed, a description of a few terms may be useful. As used, the term "proximal" has its ordinary meaning and refers to a location next to or near the point of attachment or origin or a central point, or located toward the center of the body. Likewise, the term "distal" has its ordinary meaning and refers to a location situated away from the point of attachment or origin or a central point, or located away from the center of the body. The term "posterior" also has its ordinary meaning and refers to a location behind or to the rear of another location. Last, the term "anterior" has its ordinary meaning and refers to a location ahead of or to the front of another location.

These anatomical terms are consistent with the user wearing the actuation system referring to an anatomical position. An anatomical position is generally defined as the erect position of the body with the face directed forward, the arms at the side, and the palms of the hands facing forward, and which is a reference in describing the relation of body parts to one another.

The terms "rigid," "flexible," "compliant," and "resilient" may distinguish characteristics of portions of certain features of the actuation system. The term "rigid" should denote that an element of the actuation system, such as a frame, is generally devoid of flexibility. Within the context of features that are "rigid," it should indicate that they do not lose their overall shape when force is applied and may break if bent with sufficient force. The term "flexible" should denote that features are capable of repeated bending such that the features may be bent into non-retained shapes or the features do not retain a general shape, but continuously deform when force is applied.

The term "compliant" may qualify such flexible features as generally conforming to the shape of another object when placed in contact therewith, via any suitable natural or applied forces, such as gravitational forces, or forces applied by external mechanisms, for example, strap mechanisms. The term "resilient" may qualify such flexible features as generally returning to an initial general shape without permanent deformation. As for the term "semi-rigid," this term may connote properties of support members or shells that provide support and are free-standing; however, such support members or shells may have flexibility or resiliency.

The embodiments of the disclosure are adapted for a human body and may be dimensioned to accommodate different types, shapes, and sizes of human body sizes and contours. For explanatory purposes, the actuation system embodiments described correspond to different sections of a body and are denoted by general anatomical terms for the human body.

The embodiments of the actuation system may correspond to anterior and posterior body sections defined by an anterior-posterior plane. The anatomical terms described are not intended to detract from the normal understanding of such terms as readily understood by one of ordinary skill in the art of orthopedics, prosthetics, braces, human interfaces, medical devices, and supports.

B. Description of Prior Art APO

Figure 2:
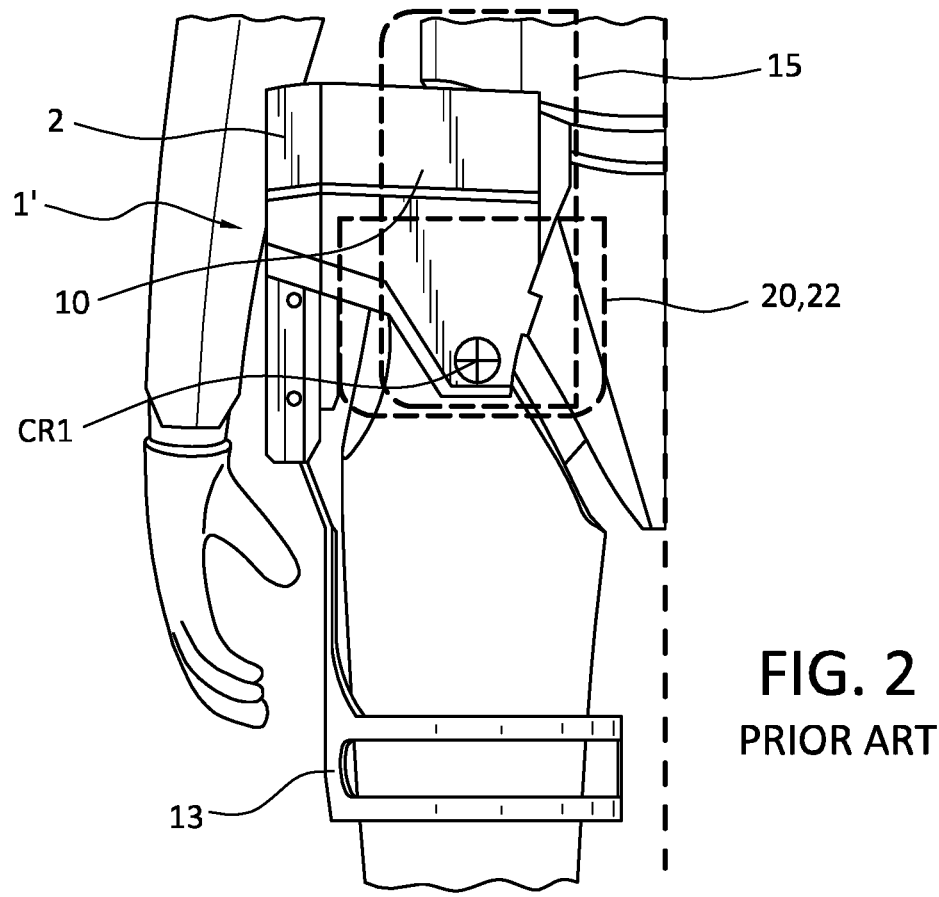
FIG. 2 is a detail view of a left monolateral aspect in the prior art actuation system of FIG. 1.

FIGS. 1 and 2 exemplify a prior art APO 30, as discussed in WO 2016/128877. The mechanical structure of the APO 30 is symmetrical regarding the sagittal plane, and includes two main actuation systems, one for each hip articulation, denoted respectively by 1, 1'. Each of the actuation systems 1, 1' has transmission devices that transfer the assistive torque from the actuation unit to the human hip articulation. Since the two actuation systems 1, 1' are identical, unless there are necessary adaptations to make them suitable to left and right articulation, respectively, reference simply will be made to the left actuation system denoted by 1'.

The actuation system 1' comprises firstly a fixed frame 11, for the connection, permanently or removably, to the structure of the APO 30. In the present case, the fixed frame 11 includes a connection plate or flange 14. The fixed frame 11 interfaces and stabilizes the APO 30 on the body of the user, and can be secured to the latter using an appropriate orthotic shell 12 configured for the user's pelvis or torso. On the connection plate or flange 14 is mounted plates 15 which each support a transmission device 2.

The transmission device 2 is mechanically connected to a motor axis M and configured to transfer an assistive force or effect on an output axis D which reproduces or augments the physiological axis of flexion-extension of the hip. The M and D axes are parallel or substantially parallel and may be spaced apart by a distance I, facilitating placement of a drive system posterior of the user's hips/legs/buttocks, or generally as advantageous for a particular use.

An actuation system 20 has a rotary joint for abduction-adduction of the hip, and a rotary joint for intra/extra-rotation of the hip, collectively denoted as the passive joint mechanism 22, which allow the execution of movement at the hip. The passive joint mechanism 22 for abduction/adduction is located just over the user's hip and protrudes well beyond the posterior of the user. The passive joint mechanism 22 kinematically couples with a rotational degree of freedom around, respectively, an adduction/abduction axis and an axis parallel to the axis of physiological intra-/extra-rotation.

A drive system 10 connects to the transmission device 2, which is connected mechanically in series with the passive joint mechanism 22, to the fixed frame 11.

The passive joint mechanism 22, which comprises primarily two rotary joints configured for facilitating abduction/adduction and intra/extra rotation of the hip, performs a chain or series of degrees-of-freedom adjustments via the two rotary joints by means of which the drive system 10 and the transmission device 2 are connected to the fixed frame 11. The center of rotation CR1 is arranged to be proximate the femoral head of the user. These degrees of freedom can be passive or actuated or connected to elastic elements.

The drive system 10 may be of the type called SEA ("Series Elastic Actuator"), which is known in the art. The drive system 10 is disposed at a rear portion of the APO 30 posterior of the user and corresponding to the user's back. The drive system 10 is configured to provide an assistive force or effect at its own motor axis M. The motor axis M is an axis substantially parallel to the axis around which takes place the movement of flexion-extension of the hip of the subject, in other words, an axis substantially perpendicular to the sagittal plane.

The transmission device 2 connects to a rotatably connecting rod or link 3 which transmits forces to an orthotic shell 13 arranged on a user's leg and suitable for assisting in driving the user's leg. The passive joint mechanism 22 may be spaced apart from a center of the frame 11 by a distance f, accommodating the user's dimensions and facilitating effective and comfortable transmission of forces.

C. Description of Various Embodiments

Figure 3:
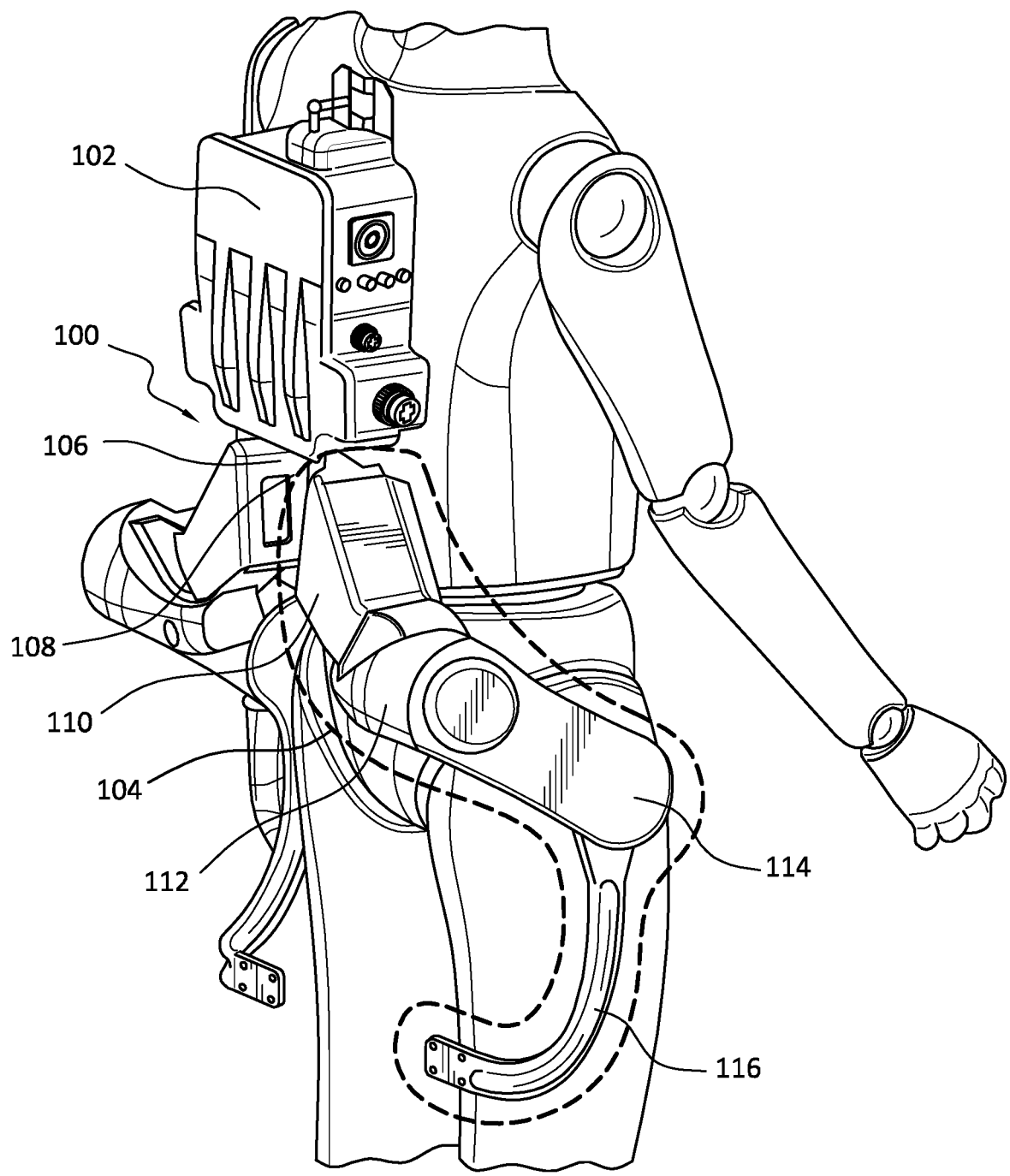
FIG. 3 is a perspective view of an embodiment of an actuation system according to the disclosure in an APO.

FIG. 3 generally illustrates an embodiment of the disclosure having an actuation system 104 in an exoskeleton 100, such as an APO. The actuation system 104 includes a passive joint mechanism 110, preferably having a multi-bar linkage. A drive system 112 is linked to the passive joint mechanism 110 and driven by a power unit 102. The drive system 112 is positionable according to the passive joint mechanism 110. A transmission device 114 is arranged to be driven by the drive system 112. A lower body support 116 is secured to the transmission device 114.

The exoskeleton 100 comprises a frame 106, which supports the power unit 102, and upon which the actuation system 104 mounts. A plate 108 connects to the frame 106, and the passive joint mechanism 110 secures to the plate 108. The frame 106 may include support elements, such as shells, straps, belts, and other known means for securing the exoskeleton to the user.

Figure 4:
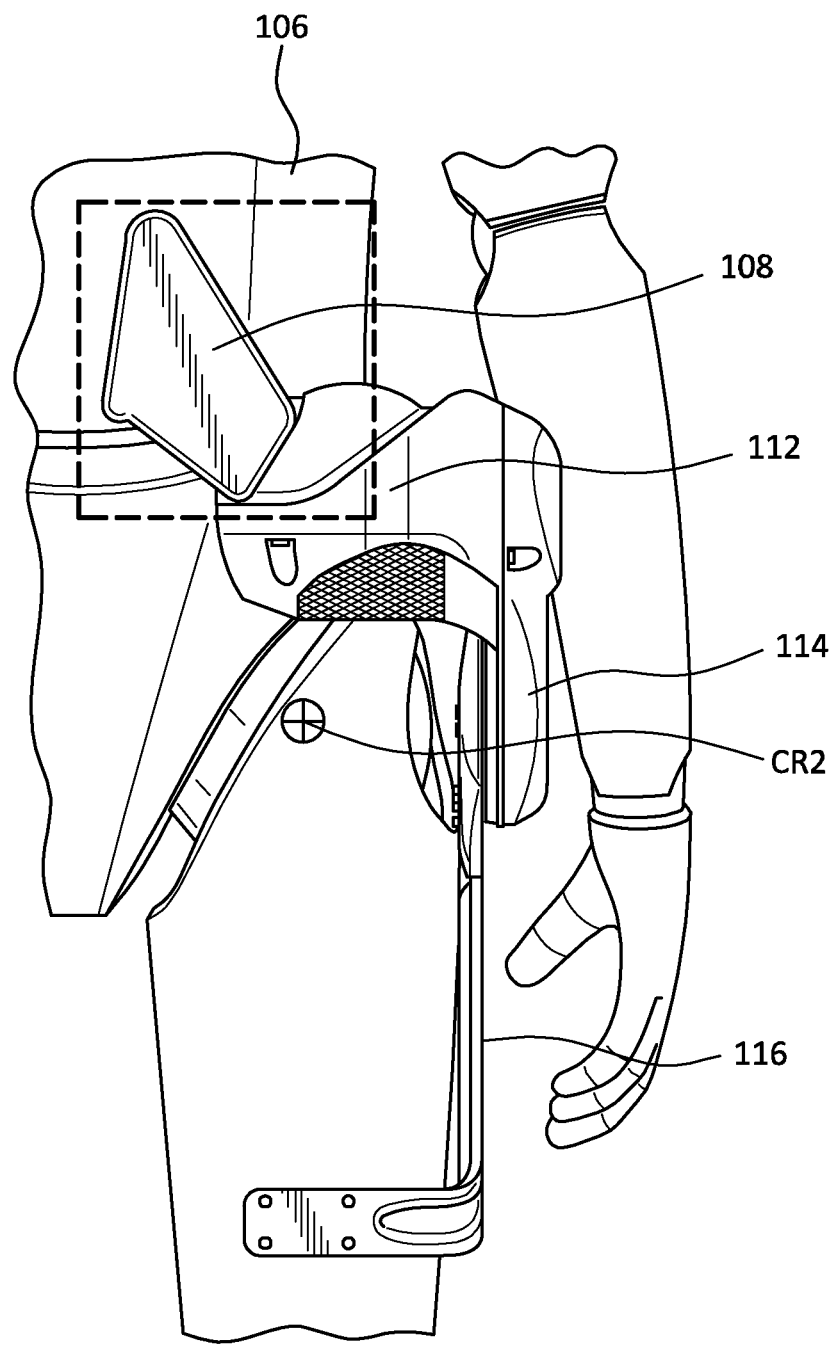
FIG. 4 is a detail view of a right monolateral aspect in the actuation system embodiment of FIG. 3.

FIG. 4 shows how the plate 108 is above the user's waist, and generally is about the lumbar region or posterior torso of the user. This arrangement is advantageous because it retains the advantages of existing devices in that it locates the center of rotation proximate the femoral head in order to properly and effectively transfer the assistive force to the user's leg/thigh at an anatomically advantaged location. The arrangement relocates the actuator system such that the disruptions and interferences to the user are minimized. The embodiments have the advantage of mitigating interference with the user's legs and mounting the linkage in an area over the user that undergoes little movement during a user's gait. There is improved seating comfort, and there is a reduced distance between the actuation devices and the user's body. The linkage generally maintains the same center of rotation as in past efforts, but without being located in an obstructive area.

As the passive joint mechanism 110 is a multi-bar linkage, not only can it be mounted a distance apart from the center of rotation, as shown by CR2 in FIG. 4, but it also has a lower profile than in the prior art, and does not extend significantly posteriorly from the user's body.

Figure 5A:
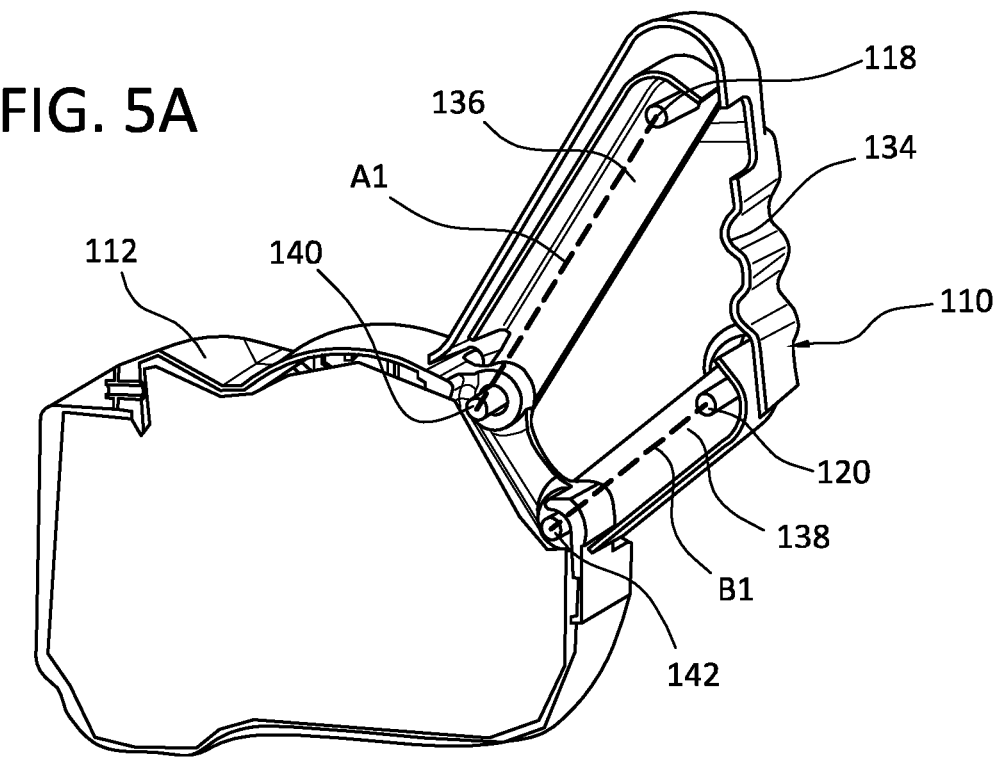
FIG. 5A is a sectional view of the passive joint mechanism of the actuation system embodiment of FIG. 3 in a first position.
Figure 5B:
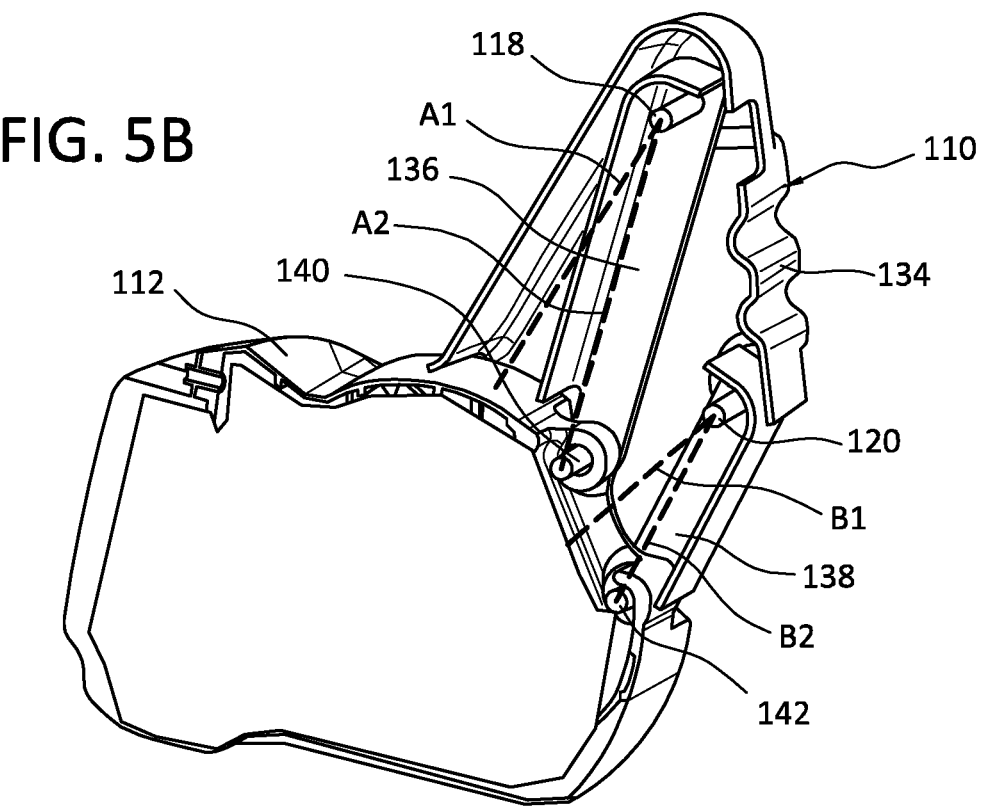
FIG. 5B is a sectional view of the passive joint mechanism of the actuation system of FIG. 5A in a second position.
Figure 6A:
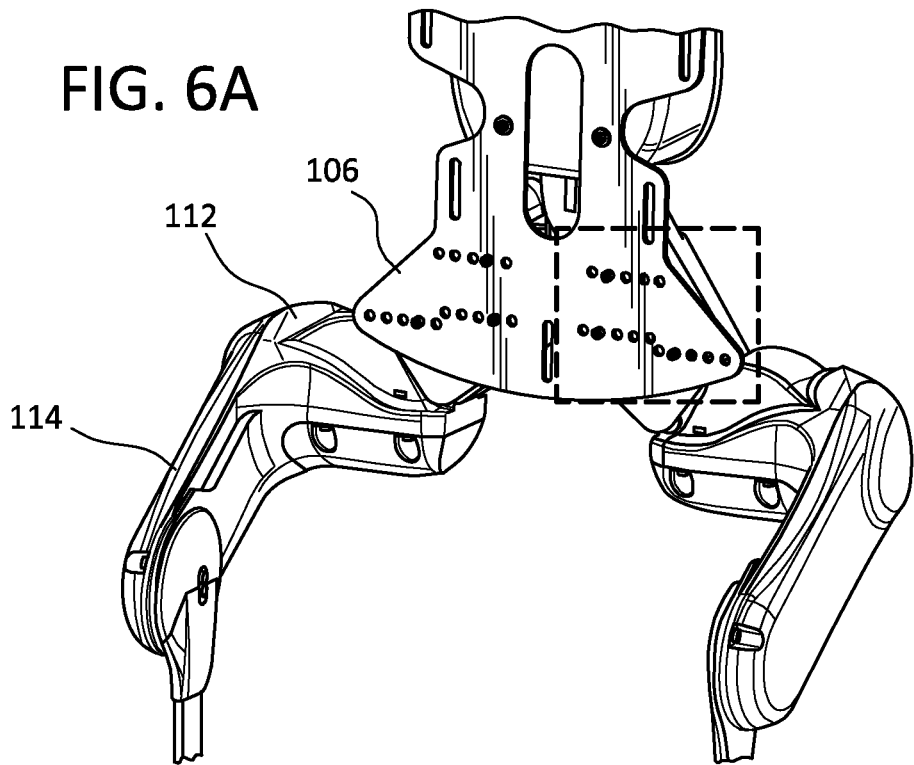
FIG. 6A is a partial perspective view of the actuation system embodiment of FIG. 3.
Figure 6B:
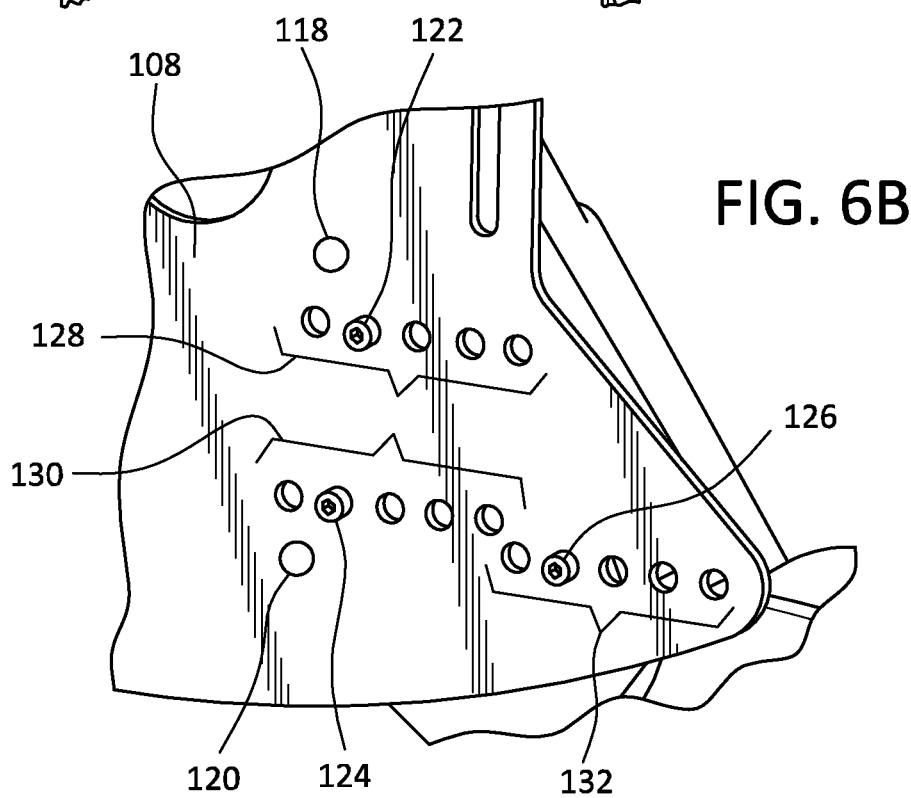
FIG. 6B is a detail view of the actuation system from FIG. 6A.

FIGS. 5A and 5B show the passive joint mechanism 110 as having a multi-bar linkage, as in a four-bar mechanism, and includes first and second links 136, 138. The first and second links 136, 138 have first and second connections 118, 120, respectively, pivotally securing to the plate 108, as shown in FIGS. 6A-6B.

There may be at least one range-of-motion stop 122, 124, 126 located on the plate 108, and arranged to limit a range of motion of at least one of the first and second links 136, 138. The plate 108 defines at least one series of openings 128, 130, 132 for accommodating and supporting the at least one range-of-motion stop 122, 124, 126 and allows for adjustments to the positions of the at least one range-of-motion stop 122, 124, 126 based on the needs of a particular user.

FIGS. 5A-5B and 7A-8B illustrate the passive joint mechanism 110 as having a housing 134 at least partially covering the first and second connections 118, 120. The housing 134 covers at least the first link 136, which is arranged to pivot therein. The housing 134 may limit a range of motion of the first link 136 in at least a first direction, for example by being arranged to abut the first link 136 at a certain degree of motion. The second link 138 may have a portion that extends beyond the periphery of the housing 134, as the second link 138 pivots. Accordingly the housing 134 may define an opening or an aperture proximate the second link 138 allowing for movement outside of the housing 134.

The first and second links 136, 138 couple to the drive system 112 by third and fourth connections 140, 142, such that the third and fourth connections 140, 142 pivotally connect to the drive system 112, and thus via the first and second links 136, 138 to the housing 134 and plate 108. FIG. 5B exemplifies how the first and second links 136, 138 translate relative to the housing 134 from a first position defined along with axial locations A1, B1, to a second position defined along with axial locations A2, B2, respectively.

Figure 7A:
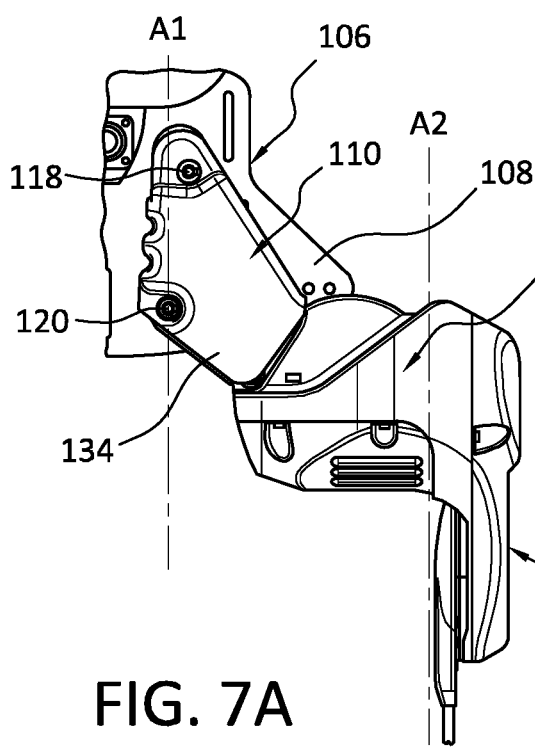
FIG. 7A is a rear perspective sectional view of the actuation system embodiment of FIG. 3 in adduction.
Figure 8A:
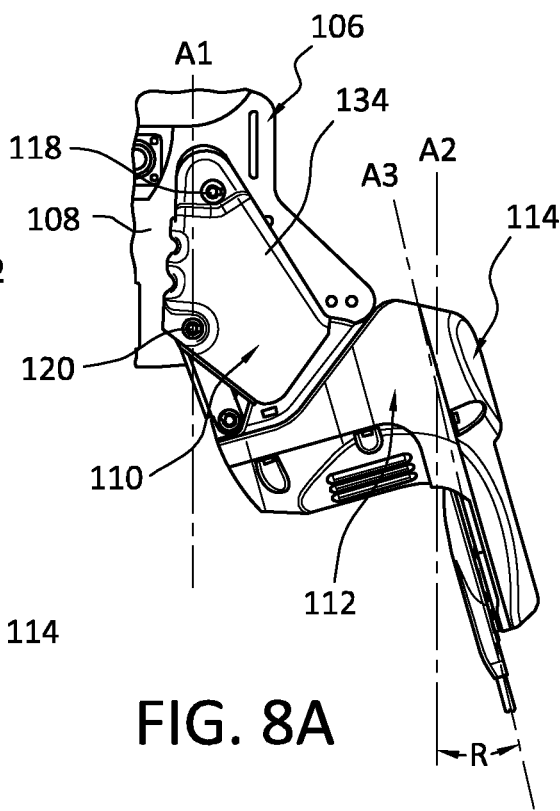
FIG. 8A is a rear perspective sectional view of the actuation system embodiment of FIG. 3 in abduction.
Figure 7B:
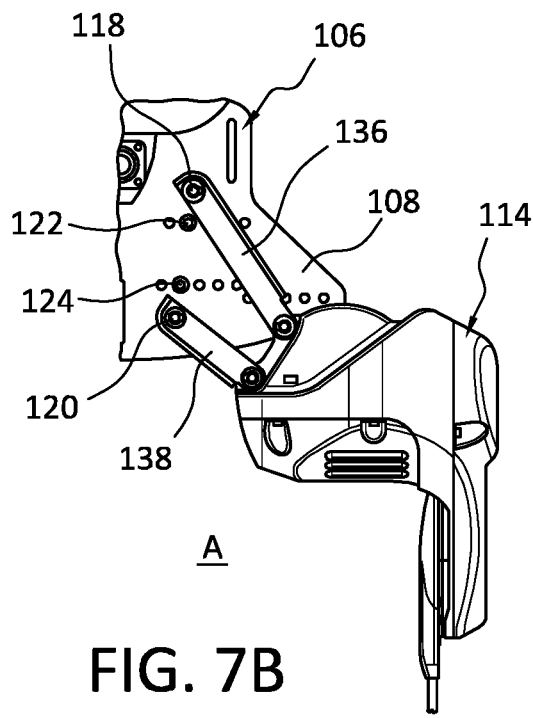
FIG. 7B is a rear perspective sectional view of FIG. 7A without the housing on the passive joint mechanism showing a position of the linkage of the passive joint mechanism in at least one adduction position.
Figure 8B:
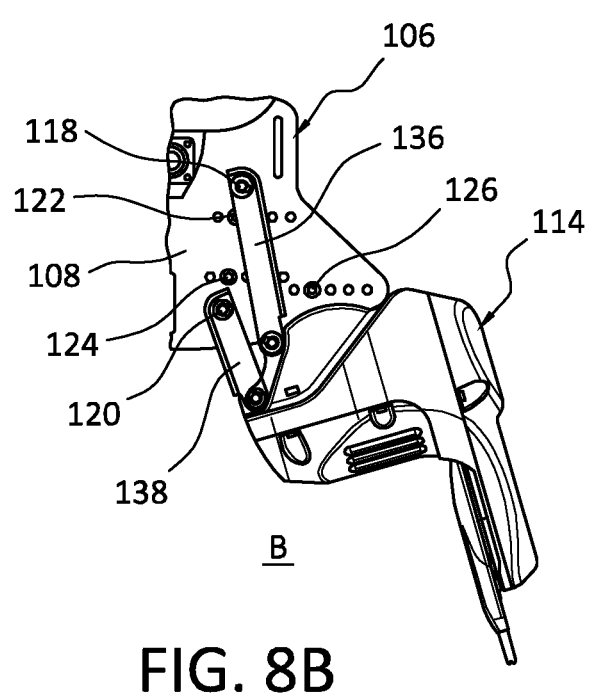
FIG. 8B is a rear perspective sectional view of the passive joint mechanism of FIG. 8A without the housing on the passive joint mechanism and showing a position of the linkage of the passive joint mechanism in at least one abduction position.

FIGS. 7B and 8B illustrate how the first and second links 136, 138 rotate from a first position A to a second position B, whereby position A exemplifies adduction and position B exemplifies abduction. Unlike in the prior art, it is found with the passive joint mechanism having a multi-bar linkage, such as with links 136, 138, the drive system 112 can be mounted or extend below the frame 106. This mechanism enables locating the passive joint mechanism preferably over the torso or lumbar region of the user, as opposed to posteriorly of the user's hip and center of rotation of the hip, while still offering adduction/abduction control. This mechanism provides a more comfortable device and overcomes challenges of existing devices, particularly the inconveniences of having the actuator system mounted at and affecting the motion of the hips.

FIG. 7A shows how the passive joint mechanism in adduction generally has parallel axes A1 and A2, whereby axis A1 is at the passive joint mechanism 110 at the frame 106 with the first and second connections 118, 120 fixed on the plate 108, and axis A2 is along with the transmission device 114. As the passive joint mechanism 110 goes into abduction, as shown in FIG. 7B, axis A3 (as compared to axis A2 in adduction) exemplifies how the linkage provides for translation of the transmission device 114 relative to the frame 106. In embodiments, the axis A3 may be rotated relative to the axis A2 by a rotation R corresponding to an angle of abduction.

Figure 9A:
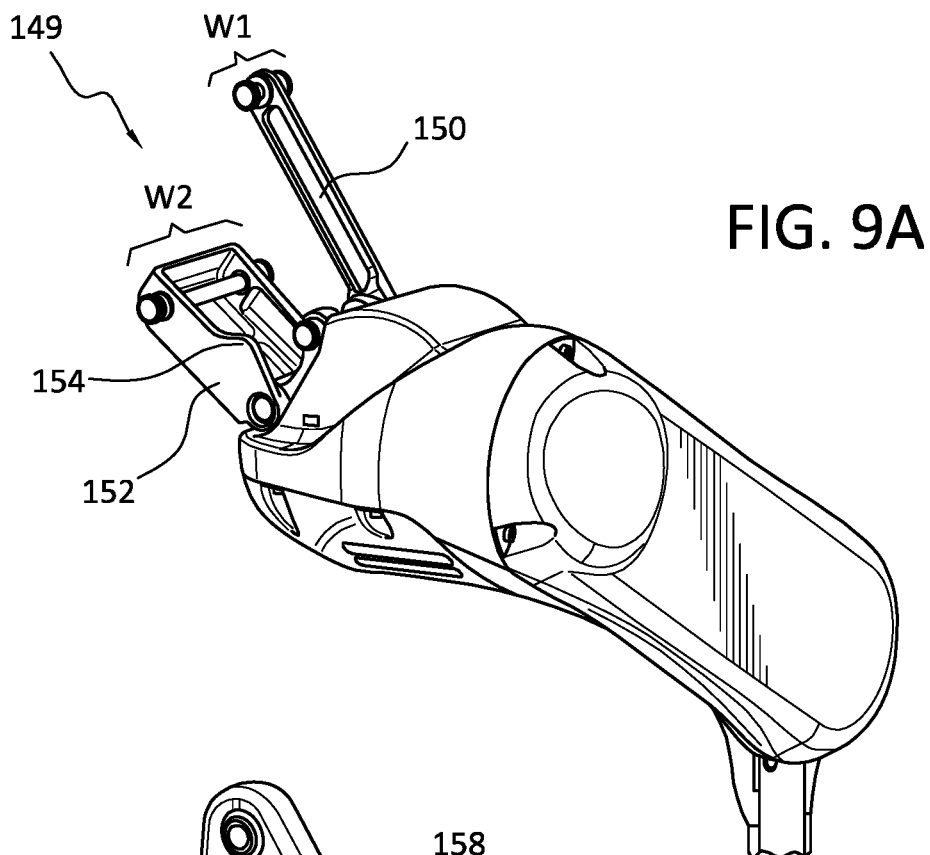
FIG. 9A is a perspective view showing another embodiment of a passive joint mechanism useable in the actuation system embodiment of FIG. 3 without a housing over the linkage.
Figure 9B:
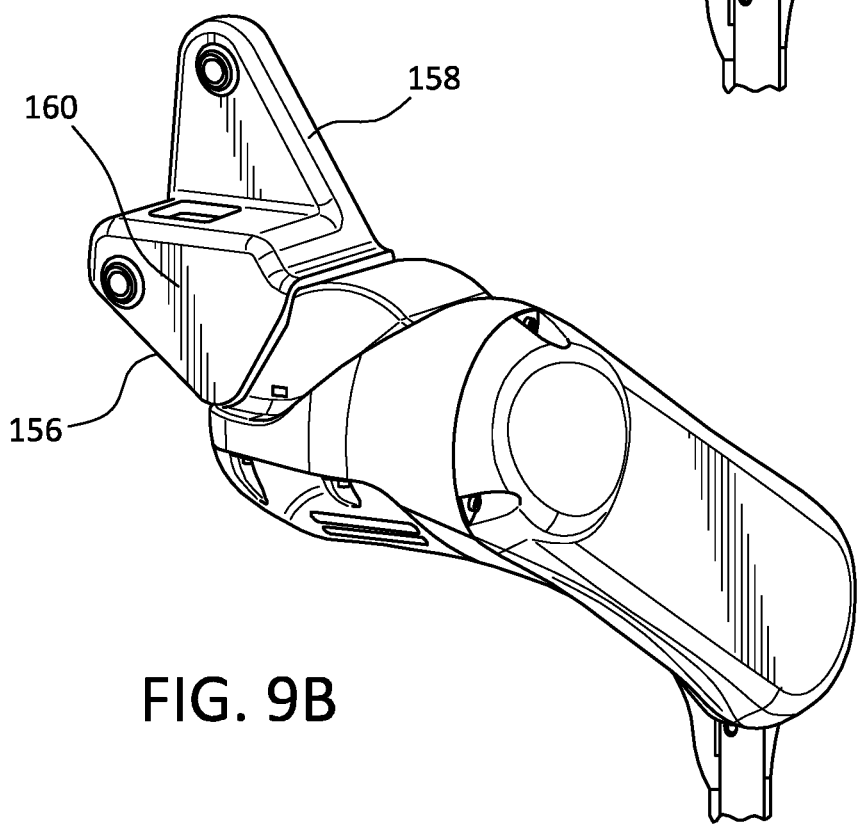
FIG. 9B is a perspective view of the embodiment of FIG. 9A with a housing over the linkage.

FIGS. 9A and 9B exemplify a variation of a multi-bar linkage 149 having a four-bar linkage with a first link 150 and a second link 152, such that the second link 152 has a greater width W2 than a width W1 of the first link 150. As the second link 152 bears force greater than the first link 150, the second link 152 is advantageously stronger than the first link 150, which may be achieved by its size and geometry. Due to the second link 152 bearing greater forces, the dimensions of the first link 150 can be minimized to save space. The second link 152 may have a range-of-motion stop 154 defined along a length thereof. In embodiments, the range of motion stop may be defined on the second link 152 and arranged to abut against a surface of the housing or the drive system 112. In other embodiments, the extension stop may be defined along a different surface.

The multi-bar linkage 149 includes a housing 160 in which the first and second links 150, 152 are generally located. The housing 160 preferably has first and second sections 156, 158 configured and dimensioned to accommodate the widths of the first and second links 150, 152, respectively.

Figure 10A:
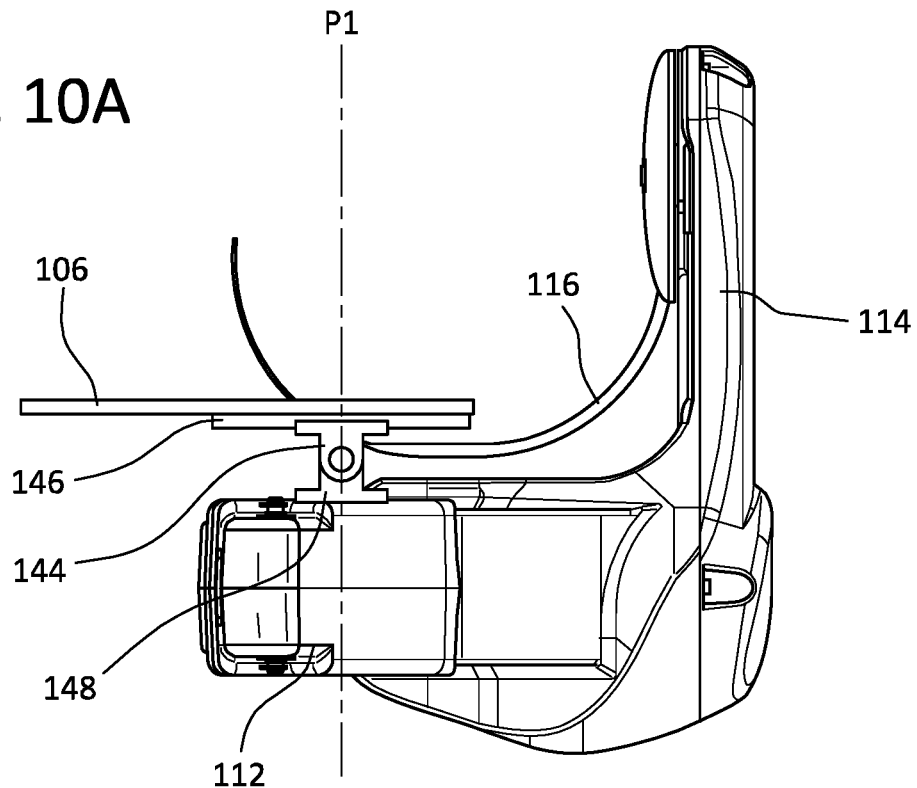
FIG. 10A is a top perspective view showing another embodiment of a passive joint mechanism useable in the actuation system embodiment of FIG. 3 in a first rotational position.
Figure 10B:
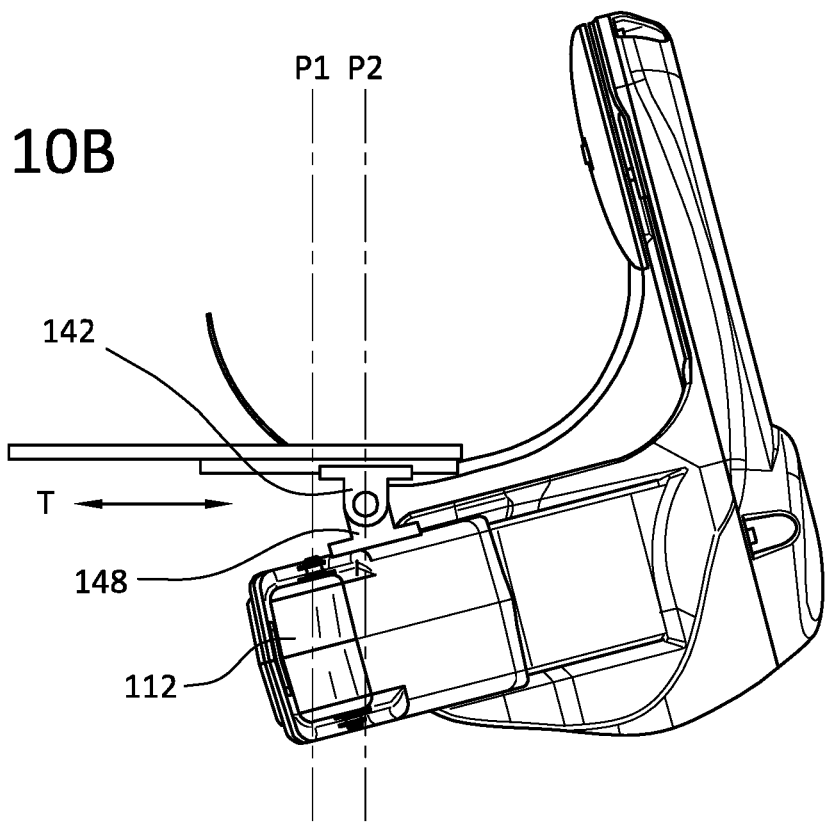
FIG. 10B is a top perspective view showing the embodiment of the passive joint mechanism in FIG. 10A in a second rotational position.

Turning to FIGS. 10A-10B, a linkage 144 secures to a slider 146 slidably connected to the frame 106. The linkage 144 may pivotally connect to the transmission device 114 for providing extra-intra rotation of the hip. The linkage 144 pivotally secures to a mount 148 provided on the drive system 112. The linkage 144 may be arranged similarly as in the preceding embodiments. The slider 146 may be arranged to translate the linkage 144 a distance T relative to the frame 106. The slider 146 allows for greater flexibility of use of the exoskeleton system as it can adapt to a user's dimensions and provide optimized force transmission.

The pivoting or rotation of the linkage 144 relative to the frame 106 may advantageously be driven by the cuff or shell 166 as the user rotates their hip inward or outward. The mount 148 may attach and pivot along an axis located at a first position P1, independent of or in cooperation with translation along the slider 146. As the linkage 144 thus translates and rotates, the linkage 144 may move from a parallel arrangement with the frame 106 to an offset or rotated relationship. The mount 148 may translate to a second position P2, with a varying clearance between the linkage 144 and the frame 106. The depicted arrangement of the linkage 144 as slidably and pivotally arranged on the frame 106 is merely exemplary and not intended to be limiting, and the linkage 144 may attach to the frame 106 in any suitable manner.

Figure 11A:
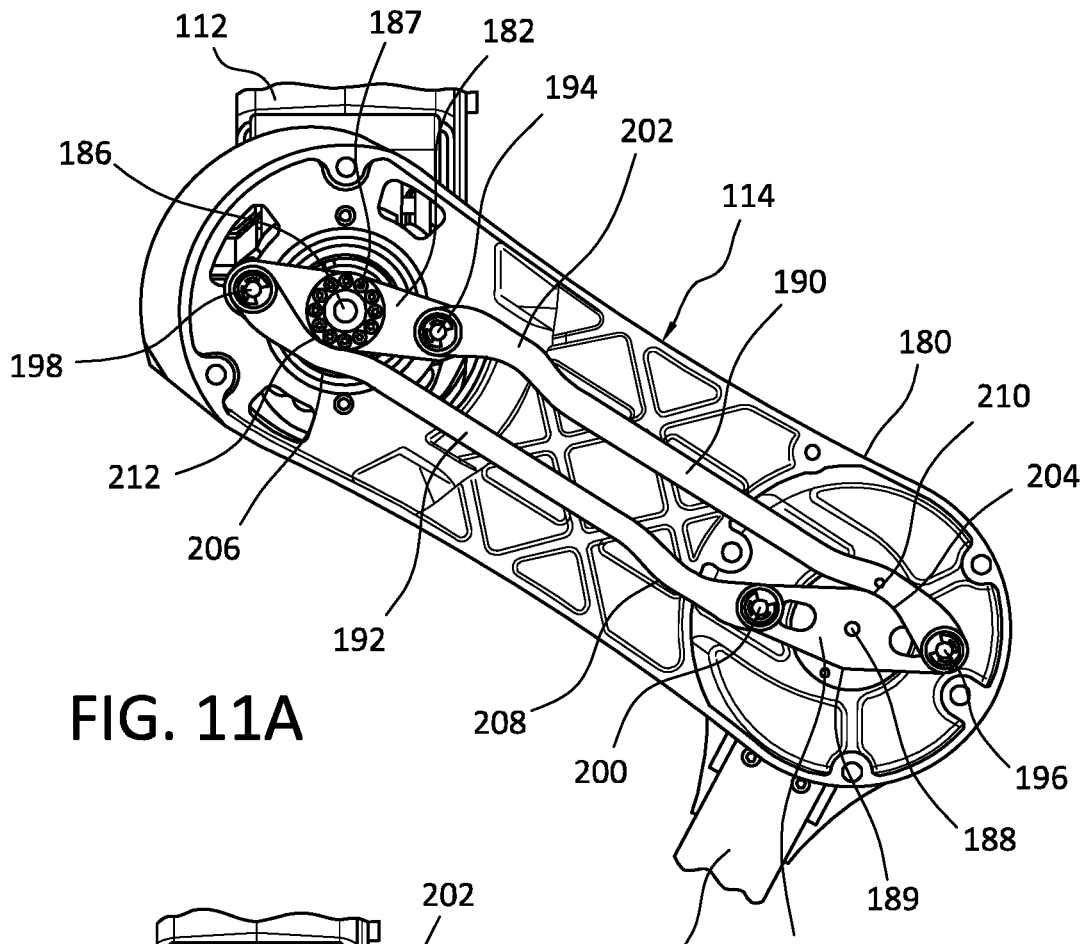
FIG. 11A is a perspective view of an embodiment of a transmission device in a first position and usable in the actuation system embodiment of FIG. 3.
Figure 11B:
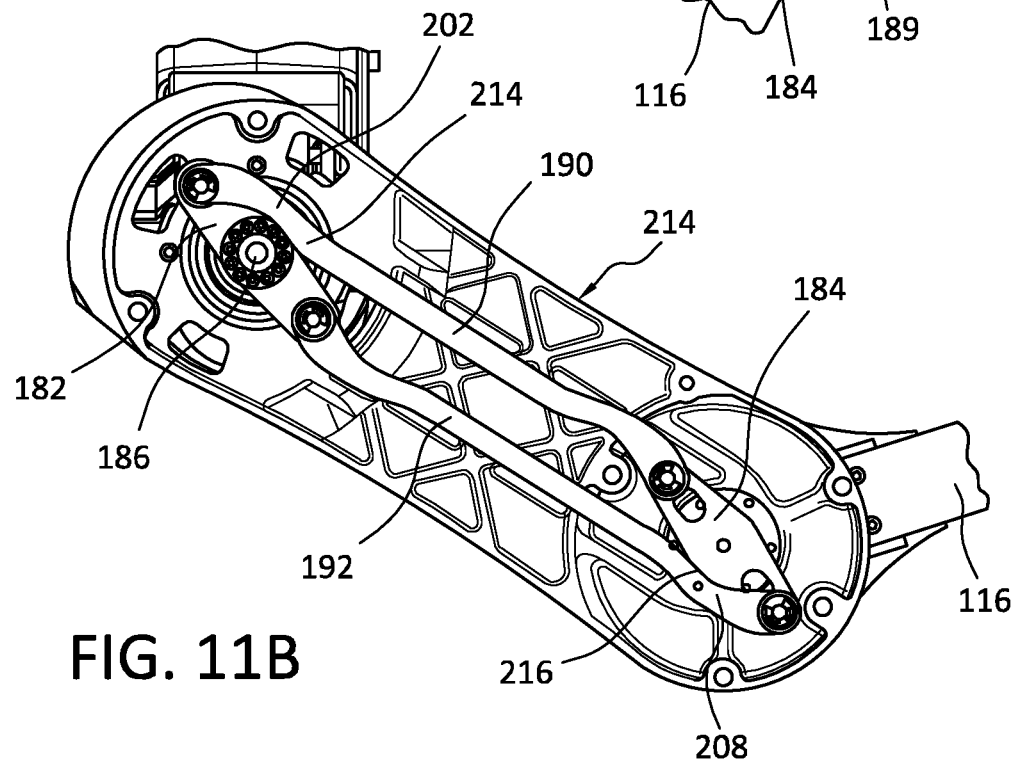
FIG. 11B is a perspective view of the embodiment of FIG. 11A in a second position.

FIGS. 11A and 11B illustrate an embodiment of a transmission device 114 defining a housing 180 in which first and second pivot plates 182, 184 are located and pivotable about axes or pivot points 186, 188. The second pivot plate 184 is driven by at least one link 190, 192 secured to the first pivot plate 182. The first pivot plate 182 is actuated by the drive system 112. The at least one link 190, 192 is pivotally connected to the first and second pivot plates 182, 184 at pivot points 194, 196, 198, 200.

The at least one link 190, 192 defines first and second arcuate segments 202, 204, 206, 208 adapted to strike a bearing 187, which surrounds the pivot point 186 of the first pivot plate 182, and at least one strike part 189 of the second pivot plate 184. Upon striking the bearing 187 or the at least one strike part 189, the range of motion of the at least one link 190, 192 is prevented in the direction of rotation upon colliding of the arcuate segments 202, 204, 206, 208 at collision zones 210, 212, 214, 216. The at least one strike part 189 is preferably defined on opposed sides of the second pivot plate 184.

This arrangement of collision zones 210, 212, 214, 216, bearing 187, and strike part 189 advantageously provides a range of control for the linkage 144 of the transmission device 114, thus facilitating smooth motion that controls, e.g., abduction/adduction while allowing a more intuitive operation for a user. The depicted embodiment is merely exemplary, and the disclosure is not limited thereto; rather, an actuation system according to the disclosure may have any suitable configuration.

The embodiments described herein provide improvements over existing exoskeletons comprising actuator systems by relocating the actuators to a portion of the user's body that causes less interference and discomfort while not compromising the efficacy of the actuator unit in providing forces to aid a user's movements.

The invention claimed is:

1. An exoskeleton, comprising:
a frame; and
an actuation system including:
a transmission device;
a passive joint mechanism connecting the frame to the transmission device, the passive joint mechanism having a four-bar linkage;
a drive system couples the passive joint mechanism to the transmission device, and is arranged to drive the transmission device;
wherein a linkage pivotally secures to a mount provided on the drive system;
wherein the mount secures to a slider slidably connected to the frame, the linkage pivotally connecting to the transmission device and arranged to provide intra-rotation.

2. The exoskeleton of claim 1, further comprising a plate connecting to the frame, the four-bar linkage connecting to the plate and a leg support coupled to the transmission device.

3. The exoskeleton of claim 1, wherein a center of rotation for the passive joint mechanism is spaced from the passive joint mechanism.

4. The exoskeleton of claim 2, wherein the four-bar linkage includes first and second links, the first and second links having first and second connections, respectively, pivotally connecting to the plate.

5. The exoskeleton of claim 4, wherein at least one range-of-motion stop is located on the plate, and is arranged to limit a range of motion of at least one of the first and second links and wherein the plate defines at least one series of openings arranged to accommodate the at least one range-of-motion stop.

6. The exoskeleton of claim 4, further comprising a housing from which the first and second connections extend, and at least the first link pivoting therein, the housing arranged to limit a range of motion of the first link in at least a first direction.

7. The exoskeleton of claim 6, further comprising third and fourth connections pivotally connecting to the drive system, to the housing, and the first and second links, respectively.

8. The exoskeleton of claim 6, wherein the first and second links are arranged to move relative to the housing, the second link arranged to move outside of the housing.

9. The exoskeleton of claim 4, wherein the first and second links rotate from a first position to a second position, and is arranged so that the drive system goes between adduction and abduction according to rotation of the first and second links.

10. An exoskeleton, comprising:
a frame; and
an actuation system including:
a transmission device;
a passive joint mechanism connecting the frame to the transmission device, the passive joint mechanism having a four-bar linkage;
a drive system couples the passive joint mechanism to the transmission device, and is arranged to drive the transmission device;
wherein the passive joint mechanism comprises a four-bar linkage having a first link and a second link, the second link having a greater width than a width of the first link, the second link comprising a range-of-motion stop defined along a length thereof.

11. The exoskeleton of claim 10, wherein the passive joint mechanism includes a housing in which the first and second links are generally located, the housing having first and second sections accommodating the widths of the first and second links, respectively.

12. An exoskeleton, comprising:
a frame; and
an actuation system including:
a transmission device;
a passive joint mechanism connecting the frame to the transmission device, the passive joint mechanism having a four-bar linkage;
a drive system couples the passive joint mechanism to the transmission device, and is arranged to drive the transmission device;
wherein the transmission device defines a housing in which first and second pivot plates are located and pivotable about pivot points;
wherein the second pivot plate is driven by at least one link secured to the first pivot plate, the first pivot plate actuated by the drive system and pivotally connected to the first and second pivot plates at pivot points;
wherein the at least one link defines first and second arcuate segments adapted to strike a bearing about the pivot point of the first pivot plate, and at least one strike part of the second pivot plate.

13. The exoskeleton of claim 12, wherein upon striking the bearing or the at least one strike part, range of motion of the at least one link is arranged to be prevented in the direction of rotation upon colliding of the first and second arcuate segments at collision zones.

14. The exoskeleton of claim 13, wherein the bearing surrounds the pivot point and the at least one strike part is defined on opposed sides of the second pivot plate.

* * * * *